United States Patent
Hayes et al.

(10) Patent No.: US 6,456,422 B1
(45) Date of Patent: Sep. 24, 2002

(54) DIRECT OPTICAL FM DISCRIMINATOR

(75) Inventors: Robert R. Hayes, Calabasas; James H. Schaffner, Chatsworth, both of CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 09/420,627

(22) Filed: Oct. 20, 1999

(51) Int. Cl.$^7$ .............................. G02F 2/00; H04B 10/06
(52) U.S. Cl. ...................... 359/325; 359/193; 359/189
(58) Field of Search .............................. 359/325, 124, 359/125, 189, 154, 156, 190, 191, 192, 194, 195, 193

(56) References Cited

U.S. PATENT DOCUMENTS

| | | | | |
|---|---|---|---|---|
| 4,857,844 A | * | 8/1989 | Van Vaals | 324/307 |
| 4,932,739 A | | 6/1990 | Islam | 350/96.15 |
| 5,131,060 A | | 7/1992 | Sakata | 385/2 |
| 5,245,461 A | | 9/1993 | Fitzmartin | 359/195 |
| 5,400,265 A | * | 3/1995 | Kauppinen | 356/346 |
| 5,579,105 A | * | 11/1996 | Belton et al. | 356/310 |
| 5,594,577 A | * | 1/1997 | Majima et al. | 359/124 |
| 5,606,541 A | | 2/1997 | Finkelstein et al. | 369/112 |
| 5,646,762 A | | 7/1997 | Delavaux et al. | 359/173 |

(List continued on next page.)

FOREIGN PATENT DOCUMENTS

| | | | |
|---|---|---|---|
| EP | 0 473 873 | 3/1992 | |
| EP | 0 591 866 | 4/1994 | |
| EP | 0 591 866 A2 | * 4/1994 | ........... H04B/10/14 |
| WO | 99/25081 | 5/1999 | |
| WO | 00/51271 | 8/2000 | |

OTHER PUBLICATIONS

Kalman, R.F. et al., "Dynamic Range of Coherent Analog Fiber–Optic Links,"0 Journal of Lightwave Technology, vol. 12, No. 7, (Jul. 1994), pp. 1263–1277.

Hirano, A. et al., "All–optical limiter circuit based on four–wave mixing in optical fibres," Electronics Letters, vol. 34, No. 14 (Jul. 9, 1998) pp. 1410–1411.

(List continued on next page.)

Primary Examiner—Frank G. Font
Assistant Examiner—Roy M. Punnoose
(74) Attorney, Agent, or Firm—Ladas & Parry

(57) ABSTRACT

A method and apparatus for optical frequency modulation discrimination. An optical beam is split into a first optical beam and a second optical beam A first photodetector is provided, the first photodetector providing a first current responsive to the first optical beam input thereon, the first photodetector having a first photodetector spectral response and being biased such that the first current is in a first direction. A second photodetector is also provided, the second photodetector providing a second current responsive to the second optical beam input thereon, the second photodetector having a second photodetector spectral response and being biased such that the second current is in the first direction. An input of a transimpedance amplifier is coupled to an output of the first photodetector and to an input of the second photodetector to provide an output of the transimpedance amplifier proportional to the difference between the first current and the second current. A first optical filter is provided to receive the first optical beam prior to incidence upon the first photodetector and a second optical filter to receive the second optical beam prior to incidence upon the second photodetector, wherein the first photodetector spectral response and the second photodetector spectral response are each broader than respective passbands of the first optical filter and the second optical filter to provide photocurrent vs. optical frequency characteristics determined by the respective first optical filter and the second optical filter.

19 Claims, 5 Drawing Sheets

U.S. PATENT DOCUMENTS

| | | |
|---|---|---|
| 5,726,855 A | 3/1998 | Mourou et al. ............. 361/213 |
| 5,742,714 A | 4/1998 | Byron |
| 5,786,913 A | 7/1998 | Pfeiffer ...................... 359/119 |
| 5,923,683 A | 7/1999 | Morioka et al. ............... 372/6 |
| 5,974,209 A | 10/1999 | Cho et al. ..................... 385/28 |

OTHER PUBLICATIONS

Sorin, W.S. et al., "Frequency Domain Analysis of an Optical FM Discriminator," Journal of Lightwave Technology, vol. 10, No. 6, (Jun. 1992), pp. 787–793.

Swanson, E.A. et al., "High Sensitivity optically preamplified direct detection DSPK receiver with active delay–line stabilization," IEEE Photonic Tech. Lett. vol. 6, (1994) p. 263–265.

Wong, William S., et al., "Self–switching of optical pulses in dispersion–imbalanced nonlinear loop mirrors," *Optics Letters*, vol. 22, No. 15, pp. 1150–1152 (Aug. 1, 1997).

Mamyshev, P.V., "All–optical data regeneration based on self–phase modulation effect," *ECOC '98*, 20–24, pp. 475–476 (Sep. 1998).

"Fabry–Perot Interferometer" data from SCIMEDIA, Http://www.scimedia.com/chem–ed/optics/selector/fabry–pe.htm, (Dec. 7, 1999).

"Electromagnetic Spectrum" data from SCIMEDIA, Http://scimedia.com/chem–ed/light/em–spec.htm, (Dec. 7, 1999).

Delorme, F., et al., "Ultra–Fast Optical Switching Operation of DBR Lasers Using an Electro–Optical Tuning Section, " *IEEE Photonics Technology Letters*, vol. 7, No. 3, pp. 269–271 (Mar. 1995).

* cited by examiner

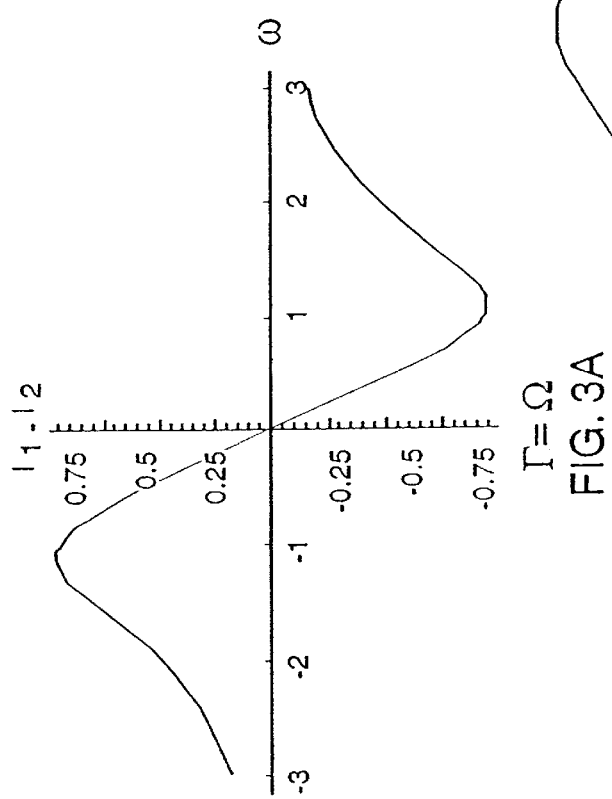
FIG. 3A  Γ=Ω
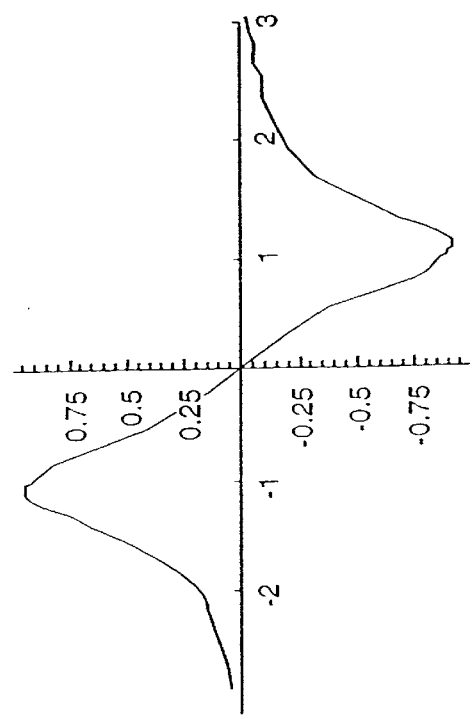
FIG. 3B  Γ=0.5 Ω
FIG. 3C  Γ=2.0 Ω

DIRECT OPTICAL FM DISCRIMINATOR

FIELD OF THE INVENTION

This invention relates to the field of communications, and, in particular, to optical devices for satellite communications systems.

BACKGROUND

Orbiting satellites are an important aspect of modern communication systems. Originally used for "single-bounce" communication, with a signal going up from one place on the surface of the earth and coming down in another, communication satellites are now being used to form complex networks in space, with each satellite in the network being able to communicate with many, but not all, of the other satellites. Optical intersatellite links, with their high directionality, high energy efficiency, and tremendous information bandwidth, allow satellites to talk to one another, and to transmit a much larger amount of information. Optical FM links, a new concept, offer a way to transmit not only digital signals, but also analog signals, and to do this with a much higher signal quality than was heretofore possible. However, effective optical FM links have not yet been demonstrated primarily because of the lack of appropriate photonic components, such as FM optical sources, limiters, and discriminators.

The only experimentally-proven discriminator that has appeared in the literature to date is a Mach-Zehnder interferometer with a delay line in one branch, as discussed in the Journal of Lightwave Tech., Vol. 10, 787-793, 1992 article by W. V. Sorin, et al, entitled "Frequency Domain Analysis of an Optical FM Discriminator". However, the disadvantages of this approach are twofold. First, the interferometer has a sin $\Delta f$ response, instead of a desired $\Delta f$. Although approximately linear for small frequency deviations, the response becomes nonlinear for larger frequency deviations. Secondly, the delay line length, which can be several centimeters, must be held constant to a small fraction of an optical wavelength. This requires active and precise thermal control of the circuit. The size and weight of these controllers, and the added complexity associated with them, are undesirable features for space-borne (e.g., satellite communication) systems, where size and weight are of paramount importance.

U.S. Pat. No. 5,742,714 issued to Byron teaches interferometrically combining two optical waves to produce an output intensity that can vary from zero (complete destructive interference) to unity (complete constructive interference). The variation of this intensity with wavelength gives a raised cosine response, identical to that produced by the delay—line discriminator of Sorin referenced above. In fact, the Byron device is an example of a delay line discriminator, with the delay being produced by the different positional reflections in the longitudinal filters. While the Byron device uses light, splitters and filters, the device cannot provide the high-linearity needed for the high-fidelity transmission of analog signals. The nonlinearity introduced by the Byron and other interferometric discriminators produces harmonic and intermodulation distortion that can seriously degrade signal quality.

Therefore, to help further realize optical FM inter-satellite links, there exists a need for an effective photonic device that allows one to directly convert excursions in optical frequency into, variations in photocurrent, without the use of optical interferometry. The present invention provides a solution for such need by providing an optical FM discriminator with high linearity characteristics.

SUMMARY OF THE INVENTION

In accordance with the present invention, embodiments of an FM discriminator are provided which are highly linear with respect to frequency deviation. Such high linearity is of considerable importance for analog optical links since, as noted earlier, non-linearities introduce undesired harmonic and intermodulation distortion products which, being a form of noise, reduce signal quality. Further, the device in accordance with the present invention does not need the thermal control circuits and elements required by existing interferometric techniques.

In accordance with a preferred embodiment of the present invention a method and apparatus for optical frequency modulation discrimination is provided. An optical beam having a frequency $\omega$ is split into a first optical beam having a frequency $\omega$ and a second optical beam having a frequency $\omega$. A first semiconductor photodetector is provided, the first photodetector providing a first current $I_1$ responsive to the first optical beam input thereon, the first photodetector having a first photodetector spectral response and being biased such that the first current $I_1$ is in a first direction. A second photodetector is also provided, the second photodetector providing a second current $I_2$ responsive to the second optical beam input thereon, the second photodetector having a second photodetector spectral response and being biased such that the second current $I_2$ is in the first direction. An input of a transimpedance amplifier is coupled to an output of the first photodetector and to an input of the second photodetector to provide an output of the transimpedance amplifier proportional to the difference between the first current $I_1$ and the second current $I_2$. A first optical filter is provided to receive the first optical beam prior to incidence upon the first photodetector and a second optical filter to receive the second optical beam prior to incidence upon the second photodetector, wherein the first photodetector spectral response and the second photodetector spectral response are each much broader than respective passbands of the first optical filter and the second optical filter, thus providing photocurrent vs. optical frequency characteristics determined by the respective first optical filter and the second optical filter. The first optical filter and the second optical filter, respectively, can provide Lorentzian line shapes. The first optical filter and/or the second optical filter are tuneable to adjust wavelength separation between the first tunable optical filter and the second tunable optical filter to obtain maximum linearity. The first optical filter and/or the second optical filter are tuneable to operate over a broad range of operating wavelengths. The first optical filter and the second tunable optical filter can be fiber-optic tunable Fabry-Perot filters and the first photodetector and the second photodetector can be high-speed semiconductor photodetectors, such as InGaAs semiconductor photodetectors.

In accordance with an alternate embodiment of the present invention, a method and apparatus for optical frequency modulation discrimination is provided wherein an optical beam having a frequency $\omega$ is split into a first optical beam having a frequency $\omega$ and a second optical beam having a frequency $\omega$. A first photodetector is provided having a peak resonant absorption $\omega_1$, the first photodetector providing a first current $I_1$ responsive to the first optical beam input thereon, the first photodetector being biased such that the first current $I_1$ is in a first direction. A second photodetector is also provided having a peak resonant absorption $\omega_2$, the second photodetector providing a second current $I_2$ responsive to the second optical beam input thereon, the second photodetector being biased such that the second current $I_2$ is in the first direction. An input of a transimpedance amplifier is coupled to an output of the first photodetector and to an input of the second photodetector to provide an output of the transimpedance amplifier proportional to the difference between the first current $I_1$ and the second current $I_2$.

BRIEF DESCRIPTION OF THE DRAWINGS

FIGS. 3A–3C depict differential current versus frequency deviation for three different frequency situations.

DETAILED DESCRIPTION

Figure 1:
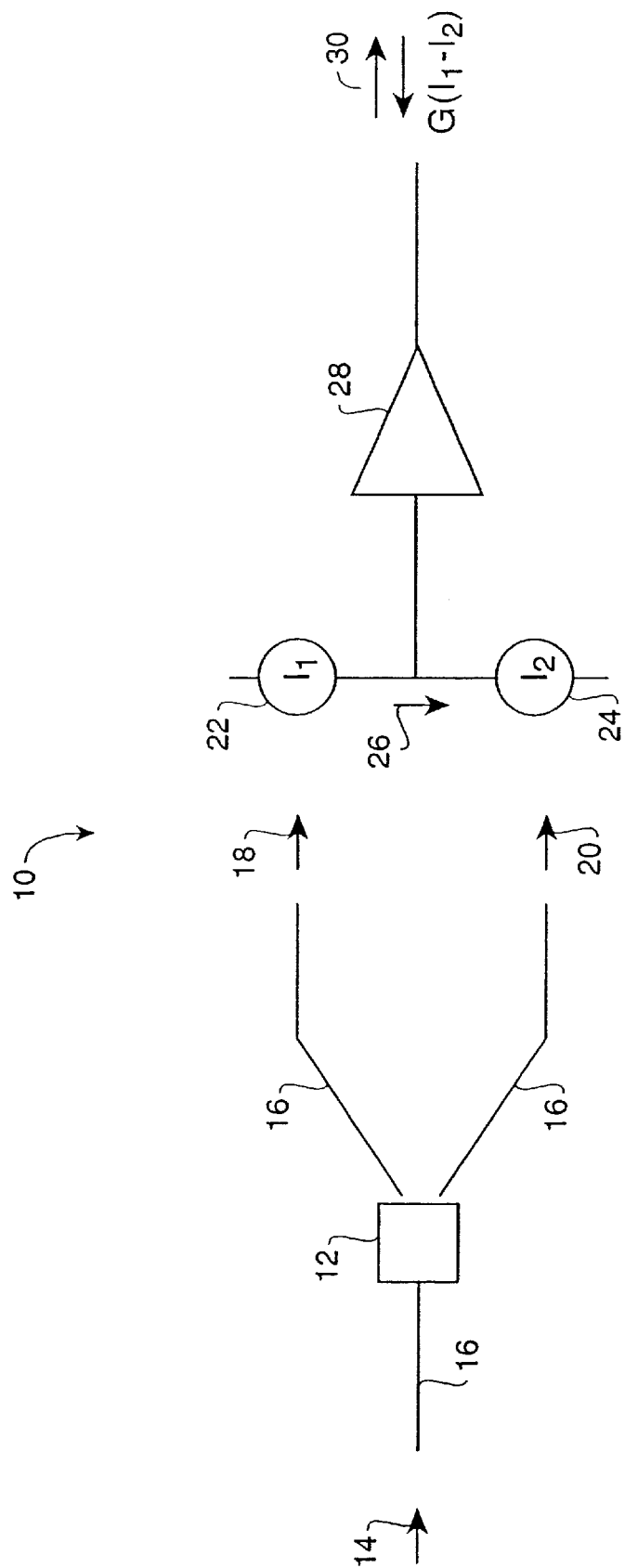
FIG. 1 shows in schematic block diagram form a first embodiment of the present invention.
Figure 2A:
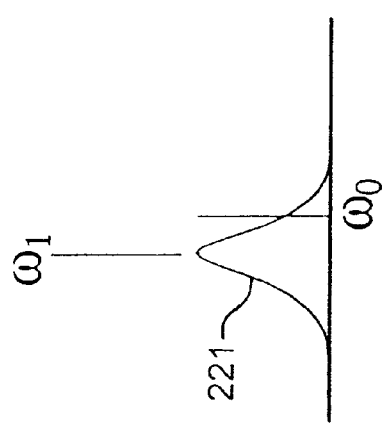
FIGS. 2A–2B depict the response of two resonantly absorbing photodetectors centered at frequencies $\omega_1$ and $\omega_2$, respectively.
Figure 2B:
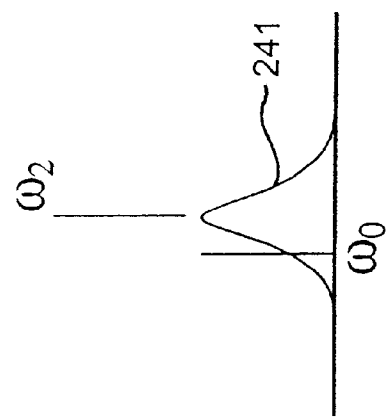

Referring to FIG. 1, an embodiment of the present invention is shown. Optical discriminator 10 includes optical splitter 12, which can be either a conventional 50:50 fiber optical splitter, (such as, for example, a Gould 22-1-0355-50-1120), or, for an unguided free-space beam, a bulk-optic 50:50 beam splitting cube (such as, for example, a Newport 05BC16NP.11), which receives the frequency-modulated optical beam 14, either guided by conventional single-mode or multi-mode fiber 16, or propagated as an expanded free-space beam. Optical splitter 12 divides optical beam 14 into two equal-intensity beams 18, 20. Each of these beams impinges upon respective photodetectors, 22, 24, one with a peak resonant absorption at $\omega_1$, as depicted in FIG. 2A, the other at $\omega_2$, as depicted in FIG. 2B. Photodetectors 22, 24 are biased (not shown) in such a way that the current flow is in direction 26. If the frequency of light beams 18, 20 coincides with the center of absorption of photodetector 22, then the current $I_1$ through photodetector 22 will be large, and the current $I_2$ through photodetector 24 will be almost zero. Because almost no current can flow through the photodetector 24 ( i.e., it has been "optically" turned off), the entire current must flow into transimpedance amplifier 28, (such as, for example, an Avantek ITA-02070 for applications below 1 GHz), coupled to the junction of photodetector 22 and photodetector 24. Signal 30, which is generally described as G ($I_1$–$I_2$) where G is the gain of transimpedance amplifier 28, out of transimpedance amplifier 28 will thus be proportional to $I_1$, and will be positive. If the frequency of light beams 18, 20 is shifted so that it now coincides with the absorption maxima of photodetector 24, the reverse will occur, namely current flow is now out of transimpedance amplifier 28, not into it, so that output signal 30 will be proportional to current $I_2$ through photodetector 24, and will be negative. If the frequency of the light beams are changed to $\omega_0$, equal currents will be generated by each detector, and the current will flow directly from one through the other, with none going into transimpedance amplifier 28. The amplifier output in this case will be zero. The optical discriminator embodiment of FIG. 1 thus amplifies only the difference in detector currents. Electrically speaking, it has high common-mode rejection. If the absorption profiles have Lorentzian lineshapes, then the equation for the differential current flow is given by $$I_1 - I_2 = A\left\{\frac{1}{(\omega_1 - \omega)^2 + \Gamma^2} - \frac{1}{(\omega_2 - \omega)^2 + \Gamma^2}\right\}$$

where $\omega_1$ and $\omega_2$ are the resonant frequencies of photodetectors 22 and 24 respectively and $\Gamma$ is the linewidth constant which determines the frequency width of the absorption. As will be shown below, there is an optimum choice of parameters which leads to an amplitude versus frequency response function that is highly linear.

Referring to FIGS. 3A–3C, there is shown the differential current versus frequency deviation for three different cases, where $\Omega=(\omega_1-\omega_2)/2$. The case depicted in FIG. 3A is the one with the highest linearity, and is realized when the linewidth parameter is equal to half the frequency separation between resonances. For this case, the cubic term in the response is zero. The next non-vanishing term in the series expansion for the response is fifth-order (All even terms are zero due to symmetry). The elimination of second and third order terms is a consequence of the symmetric nature of the absorption curves. One could thus have non-Lorentzian lineshapes, and have the same result, provided these curves were symmetric about their center frequency. However, if the absorption curves are not symmetric, then it is probably not possible to adjust parameters to achieve a condition in which both the second and third order terms are zero. Symmetric lineshapes are the norm for atomic species in a gas and for atomic defects in a solid. A gas cell detector would thus be one way of realizing this invention.

However, for high-frequency applications, where the modulation frequencies would be in excess of 1 GHz, and where the detector dimensions would hence have to be extremely small in order to collect the ionized electrons in a sufficiently short period of time, gas cells would be inadequate. In this case, a better approach would be to use an ultra-fast semiconductor photodetector having a broad optical spectral response, and to combine this detector with an optical filter having the desired narrow Lorentzian lineshape. Such an approach could be used for lower-frequency applications as well, and in fact would be the ideal way to produce an FM discriminator that would work over the entire zero to 60 GHz (or higher) frequency band, with the upper frequency limit being determined by the response time of existing photodetectors. This preferred approach is described below.

Figure 4:
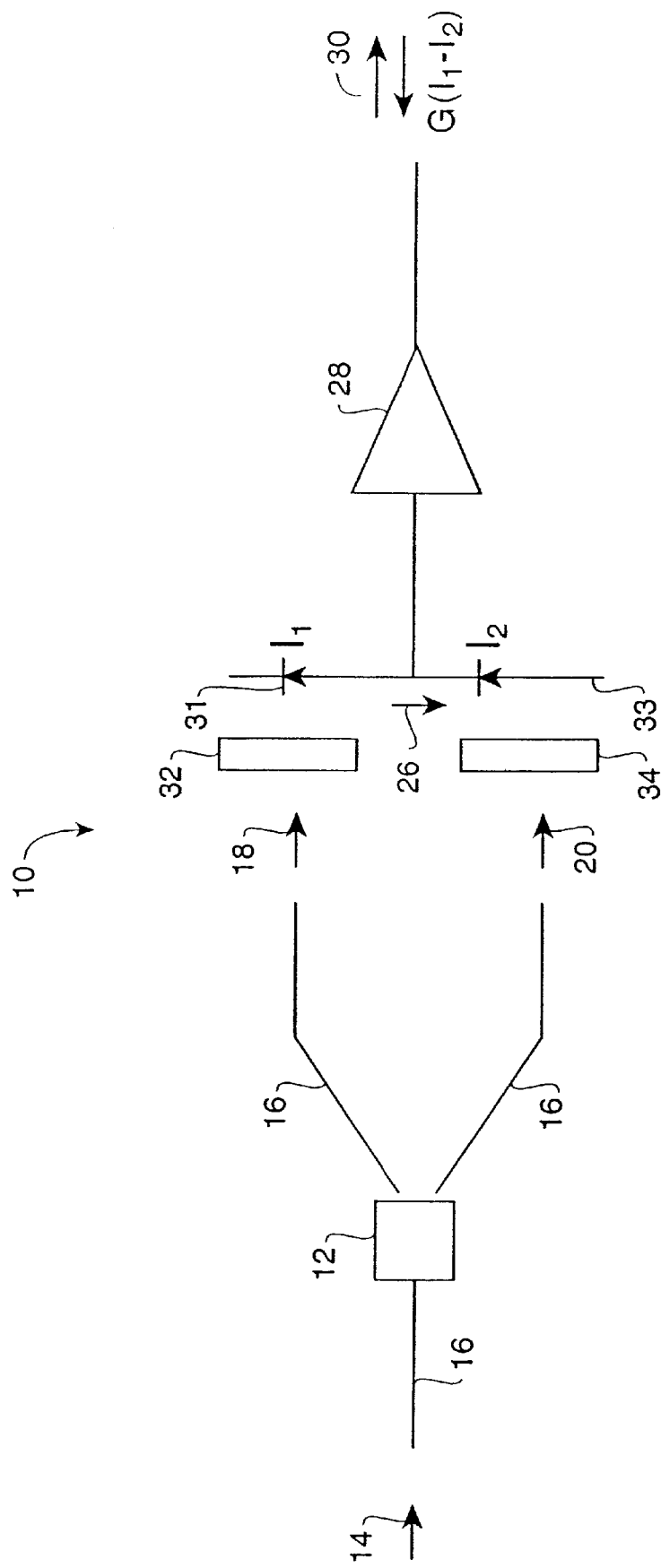
FIG. 4 shows a schematic block diagram for a second and preferred embodiment of the present invention.
Figure 5A:
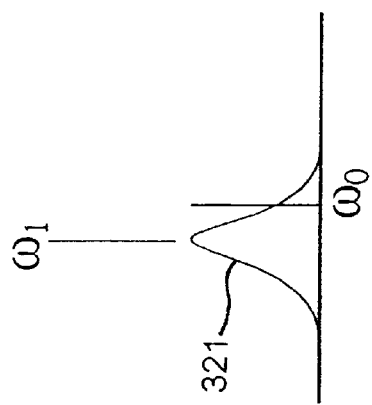
FIGS. 5A–5B depict frequency passband of optical filters in accordance with the second and preferred embodiment of the present invention.
Figure 5B:
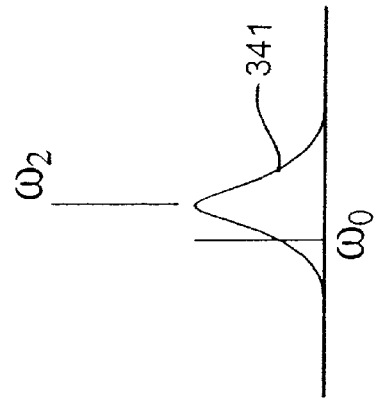

Referring to FIG. 4, a preferred embodiment is depicted wherein optical filters 32, 34 are inserted in front of respective semiconductor photodetectors 31, 33. Semiconductor photodetectors 31, 33 in this preferred embodiment have a spectral response that is much broader than the passbands of filters 32,34, depicted in FIGS. 5A and 5B respectively, so that the photocurrent vs. optical frequency characteristic of the filter-detector combination is determined by the filters alone. Optical filters 32,34 are fabricated to have a Lorentzian line shape. In fact, commercially available Fabry-Perot filters, (such as, for example, the fiber-optic Micron Optics FFP-TF series ), in addition to having the desired line shape, can also be mechanically tuned for whatever wavelength one desires. One can thus adjust the wavelength separation between the two filters so that $\Gamma=\Omega$, insuring that one achieves the highest (maximum) linearity (FIG. 2A). An added advantage is that one can then readjust the filters to operate at other wavelengths. One device, therefore, can be manufactured that will satisfy a broad range of operating wavelengths, so that one could, for example, tune the discriminator to operate anywhere within the entire bandwidth of an Erbium doped fiber amplifier (1530–1560 nm wavelength). For very high-speed operation, the photodetectors of choice would, today, be InGaAs pin semiconductor devices. In particular, the use of fiber-optic filters together with dual-balanced, fiber-coupled detectors, such as the newly-developed NTT Electronics Corp NEL model KEPD2552KYG, would allow one to achieve greater than 20 GHz response using commercial off-the-shelf devices.

Those skilled in the art can appreciate that the present invention can also be practiced utilizing various alternatives to the embodiments described herein. For example, one could use individual photodetectors, connected to individual transimpedance amplifiers, and then subtract the two resultant signals with a differential amplifier to get the required difference signal. Further, one could attach the common point between photodiodes to a conventional RF voltage amplifier, and use the internal impedance (typically 50 Ohms) of the amplifier to convert the current into a voltage. Additionally, one could use other types of symmetric but non-Lorentzian filters to achieve cancellation of the third (or higher) order term(s).

What is claimed is:

1. A method of optical frequency modulation discrimination, comprising the steps of:
   splitting an optical beam having a frequency $\omega$ into a first optical beam having a frequency $\omega$ and a second optical beam having a frequency $\omega$;
   providing a first photodetector, the first photodetector providing a first current $I_1$ responsive to the first optical beam input thereon, the first photodetector having a first photodetector spectral response and being biased such that the first current $I_1$ is in a first direction;
   providing a second photodetector, the second photodetector providing a second current $I_2$ responsive to the second optical beam input thereon, the second photodetector having a second photodetector spectral response and being biased such that the second current $I_2$ is in the first direction;
   coupling an input of a transimpedance amplifier to an output of the first photodetector and to an input of the second photodetector to provide an output of the transimpedance amplifier proportional to the difference between the first current $I_1$ and the second current $I_2$; and
   providing a first optical filter to receive the first optical beam prior to incidence upon the first photodetector and a second optical filter to receive the second optical beam prior to incidence upon the second photodetector,
   wherein the first photodetector spectral response and the second photodetector spectral response are each broader than respective passbands of the first optical filter and the second optical filter to provide photocurrent vs. optical frequency characteristics determined by the respective first optical filter and the second optical filter.

2. The method of optical frequency modulation discrimination of claim 1, wherein the first optical filter and the second optical filter respectively provide Lorentzian line shapes.

3. The method of optical frequency modulation discrimination of claim 2, wherein the first optical filter has a first center frequency and the second optical filter has a second center frequency, the first center frequency being separated in frequency from the second center frequency, and the first optical filter and the second optical filter having a linewidth parameter, the linewidth parameter generally equal to half the frequency separation between the first center frequency and the second center frequency.

4. The method of optical frequency modulation discrimination of claim 1, wherein the first optical filter and/or the second optical filter are tuneable to adjust wavelength separation between the first tunable optical filter and the second tunable optical filter to obtain maximum linearity.

5. The method of optical frequency modulation discrimination of claim 1, wherein the first optical filter and/or the second optical filter are tuneable to operate over a broad range of operating wavelengths.

6. The method of optical frequency modulation discrimination of claim 1, wherein the first optical filter and the second tunable optical filter are fiber-optic tunable Fabry-Perot filters and the first photodetector and the second photodetector are high-speed pin semiconductor photodetectors.

7. The method of optical frequency modulation discrimination of claim 1, wherein the optical beam is a frequency-modulated optical beam.

8. An optical frequency modulation discriminator, comprising:
   a optical splitter for splitting an optical beam having a frequency $\omega$ into a first optical beam having a frequency $\omega$ and a second optical beam having a frequency $\omega$;
   a first photodetector providing a first current $I_1$ responsive to the first optical beam input thereon from the optical splitter, the first photodetector having a first spectral response and being biased such that the first current $I_1$ is in a first direction;
   a second photodetector, the second photodetector providing a second current $I_2$ responsive to the second optical beam input thereon from the optical splitter, the second photodetector having a second spectral response and being biased such that the second current $I_2$ is in the first direction;
   a transimpedance amplifier having an input and an output, the input being coupled to an output of the first photodetector and to an input of the second photodetector to provide at the output of the transimpedance amplifier a current proportional to the difference between the first current $I_1$ and the second current $I_2$; and
   a first optical filter located to receive the first optical beam prior to incidence upon the first photodetector and a second optical filter located to receive the second optical beam prior to incidence upon the second photodetector, wherein the first photodetector spectral response and the second photodetector spectral response are each broader than respective passbands of the first optical filter and the second optical filter to provide photocurrent vs. optical frequency characteristics determined by the respective first optical filter and the second optical filter.

9. The optical frequency modulation discriminator of claim 8, wherein the first optical filter and/or the second optical filter are tuneable to adjust the wavelength separation between the first tunable optical filter and the second tunable optical filter to obtain maximum linearity.

10. The optical frequency modulation discriminator of claim 8, wherein the first optical filter and/or the second optical filter are tuneable to operate over a broad range of operating wavelengths.

11. The optical frequency modulation discriminator of claim 8, wherein the first optical filter and the second optical filter are fiber-optic tunable Fabry-Perot filters and the first photodetector and the second photodetector are high-speed pin semiconductor photodetectors.

12. The optical frequency modulation discriminator of claim 8, wherein the first optical filter has a Lorentzian line shape and a first center frequency and the second optical filter has a Lorentzian line shape and a second center frequency, the first center frequency being separated in frequency from the second center frequency, and the first optical filter and the second optical filter having a linewidth parameter, the linewidth parameter being generally equal to half the frequency separation between the first center frequency and the second center frequency.

13. The optical frequency modulation discriminator of claim 8, wherein the optical beam is a frequency-modulated optical beam.

14. A method of optical frequency modulation discrimination, comprising the steps of:
   splitting an optical beam having a frequency $\omega$ into a first optical beam having a frequency $\omega$ and a second optical beam having a frequency $\omega$;
   providing a first photodetector having a peak resonant absorption $\omega_1$, the first photodetector providing a first current $I_1$ responsive to the first optical beam input thereon, the first photodetector being biased such that the first current $I_1$ is in a first direction;
   providing a second photodetector having a peak resonant absorption $\omega_2$, the second photodetector providing a second current $I_2$ responsive to the second optical beam input thereon, the second photodetector being biased such that the second current $I_2$ is in the first direction; and
   coupling an input of a transimpedance amplifier to an output of the first photodetector and to an input of the second photodetector to provide an output of the transimpedance amplifier proportional to the difference between the first current $I_1$ and the second current $I_2$.

15. The method of optical frequency modulation discrimination of claim 14, wherein the peak resonant absorption $\omega_1$ of the first photodetector is separate in frequency from the peak resonant absorption $\omega_2$ of the second photodetector, and the first photodetector and the second photodetector have a linewidth parameter, the linewidth parameter being generally equal to half the frequency separation between peak resonant absorption $\omega_1$ of the first photodetector and the peak resonant absorption $\omega_2$ of the second photodetector.

16. The method of optical frequency modulation discrimination of claim 14, wherein the optical beam is a frequency-modulated optical beam.

17. An optical frequency modulation discriminator, comprising:
   a optical splitter for splitting an optical beam having a frequency $\omega$ into a first optical beam having a frequency $\omega$ and a second optical beam having a frequency $\omega$;
   a first photodetector having a peak resonant absorption $\omega_1$, the first photodetector providing a first current $I_1$ responsive to the first optical beam input thereon from the optical splitter, the first photodetector being biased such that the first current $I_1$ is in a first direction;
   a second photodetector having a peak resonant absorption $\omega_2$, the second photodetector providing a second current $I_2$ responsive to the second optical beam input thereon from the optical splitter, the second photodetector being biased such that the second current $I_2$ is in the first direction; and a transimpedance amplifier having an input and an output, the input being coupled to an output of the first photodetector and to an input of the second photodetector to provide at the output of the transimpedance amplifier a current proportional to the difference between the first current $I_1$ and the second current $I_2$.

18. The optical frequency modulation discriminator of claim 17, wherein the peak resonant absorption $\omega_1$ of the first photodetector is separate in frequency from the peak resonant absorption $\omega_2$ of the second photodetector, and the first photodetector and the second photodetector have a linewidth parameter, the linewidth parameter being generally equal to half the frequency separation between peak resonant absorption $\omega_1$ of the first photodetector and the peak resonant absorption $\omega_2$ of the second photodetector.

19. The optical frequency modulation discriminator of claim 17, wherein the optical beam is a frequency-modulated optical beam.

* * * * *